US009136549B2

(12) United States Patent
Vollmer et al.

(10) Patent No.: US 9,136,549 B2
(45) Date of Patent: Sep. 15, 2015

(54) FUEL CELL COOLING SYSTEM WITH COUPLING OUT OF HEAT

(75) Inventors: Dirk Vollmer, Achern (DE); Oliver Pfeil, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 13/555,319

(22) Filed: Jul. 23, 2012

(65) Prior Publication Data
US 2013/0022888 A1    Jan. 24, 2013

(30) Foreign Application Priority Data

Jul. 22, 2011 (DE) .......................... 10 2011 079 640

(51) Int. Cl.
| | | |
|---|---|---|
| *H01M 8/04* | (2006.01) | |
| *H01M 10/66* | (2014.01) | |
| *H01M 10/625* | (2014.01) | |
| *H01M 10/615* | (2014.01) | |
| *H01M 10/6568* | (2014.01) | |
| *H01M 10/6569* | (2014.01) | |
| *H01M 10/613* | (2014.01) | |

(52) U.S. Cl.
CPC ...... *H01M 8/04708* (2013.01); *H01M 8/04007* (2013.01); *H01M 8/04067* (2013.01); *H01M 10/613* (2015.04); *H01M 10/615* (2015.04); *H01M 10/625* (2015.04); *H01M 10/6568* (2015.04); *H01M 10/6569* (2015.04); *H01M 10/66* (2015.04); *Y02E 60/50* (2013.01)

(58) Field of Classification Search
CPC ..................... H01M 10/5004; H01M 10/5006; H01M 10/5016; H01M 10/5077; H01M 10/5093; H01M 10/5079; H01M 8/04007; H01M 8/04067; H01M 8/4708
USPC .................. 429/434, 120, 435, 436, 437, 438
See application file for complete search history.

(56) References Cited

U.S. PATENT DOCUMENTS

| | | | | |
|---|---|---|---|---|
| 5,537,956 | A * | 7/1996 | Rennfeld et al. ........... | 123/41.29 |
| 2002/0168556 | A1* | 11/2002 | Leboe et al. .................... | 429/13 |
| 2005/0167167 | A1* | 8/2005 | Miyazaki et al. .............. | 180/8.2 |
| 2009/0280395 | A1* | 11/2009 | Nemesh et al. ................. | 429/62 |
| 2010/0012295 | A1* | 1/2010 | Nemesh et al. .......... | 165/104.19 |

FOREIGN PATENT DOCUMENTS

| | | | |
|---|---|---|---|
| DE | 10142923 | 4/2002 | |
| DE | 102009035471 A1 * | 2/2011 | |
| DE | 10 2010 032 886 A1 * | 2/2012 | ............. H01M 8/04 |
| EP | 1261053 A1 * | 11/2002 | |

OTHER PUBLICATIONS

Nuesle, R., Machine translation of DE 10 2010 032 886 A1, Feb. 2012.*
Nuessle, R., Machine translation of DE 102009035471 A1, Feb. 2011.*
Olivier et al., Machine translation of EP 1261053 A1, Nov. 2002.*

* cited by examiner

Primary Examiner — Sean P Cullen
(74) Attorney, Agent, or Firm — Michael Best & Friedrich LLP

(57) ABSTRACT

A cooling system (1) for a fuel cell system (11), in particular for a vehicle, which comprises a fuel cell cooling circuit (10) for cooling the fuel cell system (11), and a battery cooling circuit (20) for cooling a battery (21), with an exchange of thermal energy between the fuel cell cooling circuit (10) and the battery cooling circuit (20).

26 Claims, 1 Drawing Sheet

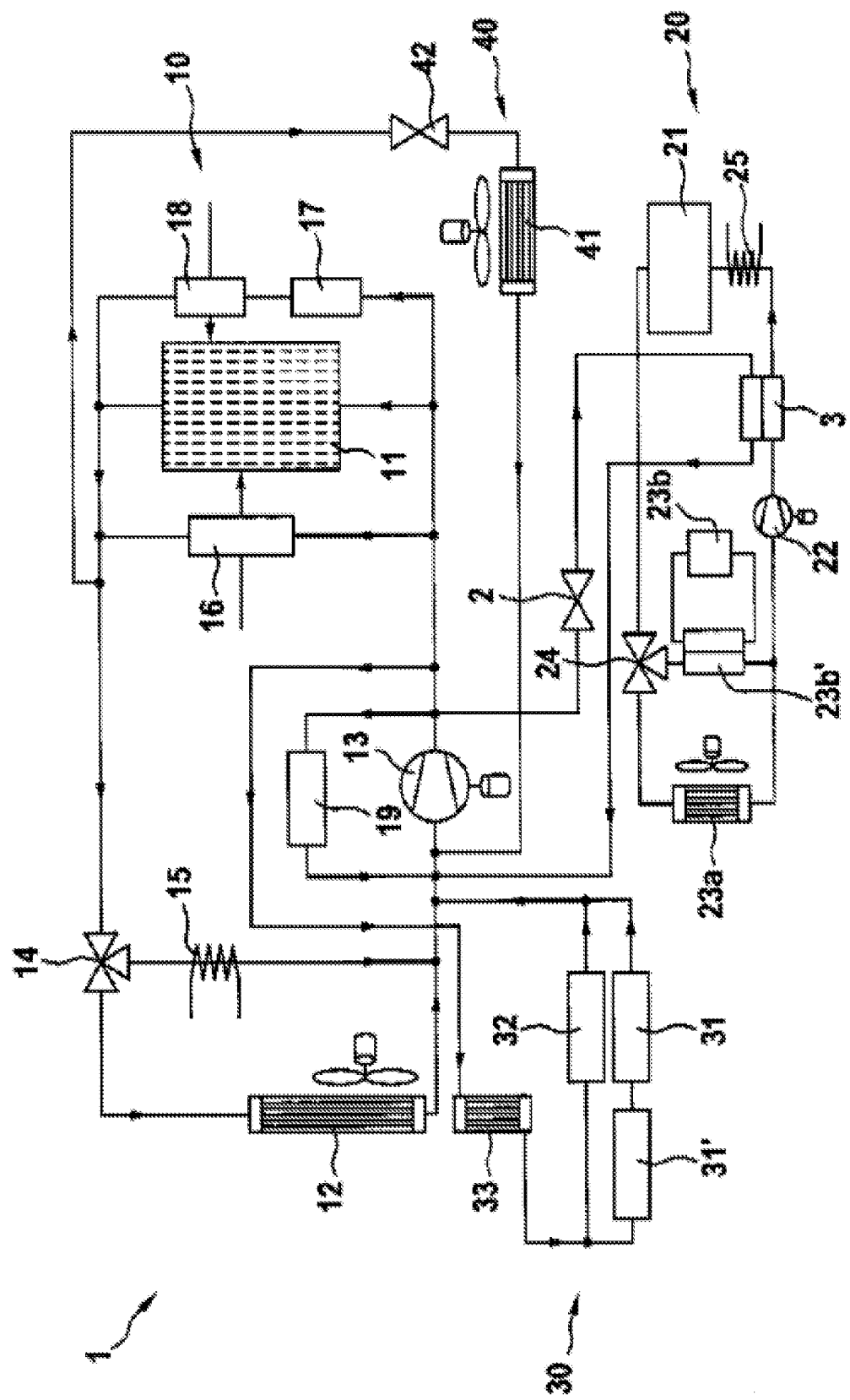

FUEL CELL COOLING SYSTEM WITH COUPLING OUT OF HEAT

BACKGROUND OF THE INVENTION

The present invention relates to a cooling system for a fuel cell system, to an operating method and to a correspondingly equipped vehicle.

Research on motor vehicles with fuel cell drive systems (FCV: "Fuel Cell Vehicle"; FCHV: "Fuel Cell Hybrid Vehicle") has been in progress for several years. DE 101 42 923 A1, for example, describes a drive assembly for a vehicle driven by a fuel cell and an internal combustion engine.

For use in motor vehicles with a fuel cell drive system, low-temperature polymer electrolyte fuel cells (NT-PEM fuel cells) are employed, in particular. Although the permissible maximum operating temperature of low-temperature polymer electrolyte fuel cells has risen significantly in the last few years and is currently around 90° C., cooling fuel cell vehicles at nominal load under extreme environmental conditions is still a challenge. Since low-temperature polymer electrolyte fuel cells customarily have only a comparatively low exhaust gas enthalpy flow, the thermodynamic conversion losses of the fuel cell are usually borne more or less completely by the cooling system. Usually, however, the flows of cooling air that can be achieved in a passenger vehicle are speed-dependent and are limited by the shape of the body, packaging etc.

DE 10142923 A1 describes a hybrid drive arrangement for vehicles driven by a fuel cell and an internal combustion engine, said arrangement having a common cooling device for the fuel cell and the internal combustion engine.

SUMMARY OF THE INVENTION

The present invention relates to a cooling system for a fuel cell system, in particular for a vehicle or a stationary power supply plant, which comprises a fuel cell cooling circuit for cooling the fuel cell system, and a battery cooling circuit for cooling a battery.

In particular, provision is made here to enable thermal energy (enthalpy) to be exchanged between the fuel cell cooling circuit and the battery cooling circuit. In particular, thermal energy can be coupled from the fuel cell cooling circuit into the battery cooling circuit.

This has the advantage that it is possible to relieve the load on the fuel cell cooling circuit, in particular temporarily, in borderline situations for the cooling capacity, e.g. when traveling uphill or when traveling for relatively long distances at maximum speed in conditions encountered in hot countries, e.g. at an ambient temperature of 45° C. This in turn has the advantage that there is the possibility of not throttling the motive power, or at least throttling it only at a later point, in borderline situations for the cooling capacity, in particular in order to protect the fuel cell system from overheating.

Electrochemical storage devices or converters, in particular, are referred to as batteries. Batteries are usually designed for operation in a particular temperature range, generally from about 10° C. to about 35° C. At somewhat higher temperatures, e.g. up to about 45° C., there is usually no damage to the battery. In other words, it is the case, in particular, that batteries do not have a sharply defined nominal operating temperature that has to be maintained but can be operated within a wide operating temperature window. Moreover, batteries, especially those provided for vehicles, advantageously have a large thermal mass or heat capacity. The permissible battery temperature range and the heat capacity of the battery can advantageously be exploited to relieve the load on the fuel cell cooling circuit.

For example, a mid-range passenger vehicle with a 90 kW fuel cell system can still be capable of operation with adequate cooling at an ambient temperature of 35° C., whereas it may have an approximately 20% deficit in cooling capacity at an ambient temperature of 45° C. Estimates show that about 1 MJ of thermal energy can be buffered by the battery cooling circuit in a typical traction battery when the permissible operating temperature range of the latter is exploited. Accordingly, a heat flow of 10 kW can be buffered for about 100 s. In the case of travel at steady maximum speed, the cooling system can thus be relieved of load over a distance of about 5 km, for example. A buffer of this kind can make the decisive contribution in avoiding capacity limitation or overheating of the cooling system and can allow the driver more motive power in situations lasting for a limited time, such as travel at maximum speed and traveling uphill.

Moreover, the cooling system can be used to improve the performance of the battery when starting at freezing temperatures, e.g. at temperatures <0° C., by coupling thermal energy from the fuel cell cooling circuit, which heats up relatively rapidly owing to the fuel cells, into the battery cooling circuit when starting at freezing temperatures in order to achieve rapid heating of the battery to a temperature within an optimum temperature range for operation of the battery and hence to achieve an increase in the performance of the battery.

In the context of one embodiment, the thermal energy can be exchanged temporarily between the fuel cell cooling circuit and the battery cooling circuit or coupled temporarily from the fuel cell cooling circuit into the battery cooling circuit. In this way, it is possible to ensure that only a defined quantity of heat is transferred.

In the context of another embodiment, heat exchange between the fuel cell cooling circuit and the battery cooling circuit, in particular the coupling of thermal energy from the fuel cell cooling circuit into the battery cooling circuit, can be activated, e.g. controlled, by means of a valve. In this way, it is possible, in particular, to ensure that a defined quantity of heat, in particular over a defined period of time, is transferred.

In the context of another embodiment, the valve is a valve with an automatically adjustable and/or self-adjusting flow rate. For example, the flow rate can be adjustable by the valve mechanically and/or electrically and/or by means of an element made from an expanding material. For example, the valve can be a control valve, in particular an automatically controlled valve, e.g. a shutoff valve. As an alternative, however, the valve can be a self-acting valve, e.g. a thermostat based on an expanding material, or a hybrid of a controlled and a self-acting valve, e.g. a mapped thermostat.

If the fuel cell cooling circuit and the battery cooling circuit use the same coolant, it is possible to feed the coolant from the fuel cell cooling circuit directly into the battery cooling circuit and vice versa.

If the fuel cell cooling circuit and the battery cooling circuit are operated with different coolants, with the fuel cell cooling circuit being operated with a mixture of deionized water and glycol and the battery cooling circuit being operated with a conventional water/glycol mixture for example, a heat exchanger, in particular a coolant/coolant (coupling) heat exchanger, can be provided.

In the context of another embodiment, heat exchange between the fuel cell cooling circuit and the battery cooling circuit, in particular the coupling of thermal energy from the fuel cell cooling circuit into the battery cooling circuit, is therefore accomplished by means of a heat exchanger.

In the case of batteries which are cooled directly by refrigerant, a coolant/refrigerant heat exchanger can be used, for example. For example, the battery coolant circuit, which is designed as a refrigerant circuit, can be operated, in particular, necessarily when coupling is activated.

In the context of another embodiment, heat exchange between the fuel cell cooling circuit and the battery cooling circuit, in particular the coupling of thermal energy from the fuel cell cooling circuit into the battery cooling circuit, takes place ahead of the battery, relative to the direction of flow in the battery cooling circuit.

In the context of another embodiment, heat exchange between the fuel cell cooling circuit and the battery cooling circuit, in particular the coupling of thermal energy from the fuel cell cooling circuit into the battery cooling circuit, takes place ahead of the fuel cell system, relative to the direction of flow in the battery cooling circuit.

In the context of another embodiment, the battery cooling circuit comprises a battery coolant pump, a battery coolant cooler and, if appropriate, a battery coolant heater. The battery coolant cooler can be a cooler which cools by means of ventilated air. As an alternative or in addition to a battery coolant cooler which cools by means of ventilated air, however, the battery cooling circuit can also have a chiller operated with a refrigerant. In this case, it is possible, in particular, for a refrigerant/coolant heat exchanger to be provided for heat transfer between the coolant of the battery cooling circuit and the refrigerant of the chiller.

In the context of another embodiment, the battery is a traction battery (which can also be referred to as an electric traction accumulator). The battery can have a capacity of the order of about 2 kWh, for example. Batteries of this kind typically have a large thermal mass, which can be exploited in an advantageous way for the invention.

In the context of another embodiment, the battery is a nickel metal hydride battery or alkali ion battery, e.g. a lithium ion battery. Batteries of this kind are preferably operated in such a way with respect to coupling in of heat, for example, that the individual cells have a homogeneous temperature, wherein the temperature spread of the individual battery cells is <5 K, for example.

In the context of another embodiment, the fuel cell cooling circuit is additionally used to control the temperature of the cathode gas and/or of the anode gas of the fuel cell system. In this way, it is advantageously possible to achieve a multiple benefit.

In the context of another embodiment, the fuel cell cooling circuit is the main cooling circuit, in particular the main cooling circuit of the vehicle.

For example, the fuel cell cooling circuit can comprise at least one coolant pump, e.g. the main coolant pump, a coolant cooler, e.g. a high-temperature segment cooler and, if appropriate, a coolant heater, e.g. an electric PTC resistance heater.

In addition to the fuel cell cooling circuit and the battery cooling circuit, the cooling system can also comprise an electric motor cooling circuit for cooling an electric motor and, if appropriate, associated components, e.g. an inverter and/or an air compressor, and can form a three-circuit cooling system, for example.

In the context of another embodiment, therefore, the cooling system furthermore comprises an electric motor cooling circuit for cooling an electric motor, wherein thermal energy can be exchanged between the fuel cell cooling circuit and the electric motor cooling circuit, in particular temporarily or continuously.

In the context of another embodiment, the cooling system furthermore comprises a temperature control circuit for controlling the temperature of a space, e.g. a passenger cell, wherein thermal energy can be exchanged, in particular temporarily or continuously, between the fuel cell cooling circuit and the temperature control circuit, in particular can be coupled into the temperature control circuit.

The coolant system can furthermore comprise, in particular, a system for determining the cooling capacity of the fuel cell cooling circuit and/or the temperature of the fuel cell system and/or the cooling capacity of the battery circuit and/or the temperature of the battery.

The present invention furthermore relates to a method for operating a cooling system according to the invention comprising the following method step:

coupling thermal energy (enthalpy) from the fuel cell cooling circuit into the battery cooling circuit if the achievable cooling capacity of the fuel cell cooling circuit falls below a predetermined limiting value, and/or if the temperature of the battery is below an upper temperature limit, in particular a preferred upper temperature limit, provided for the operation of the battery.

While, in particular, complying with the requirements as regards the homogeneity of temperature or temperature spread of the battery, it is possible to make use of the full width of the allowed operating temperature window of the battery. As already explained, the battery can in this way advantageously be used as a thermal buffer store.

In the context of one embodiment, the coupling of heat from the fuel cell cooling circuit into the battery cooling circuit is ended if the temperature of the battery and/or the achievable cooling capacity of the battery cooling circuit reaches a predetermined value and/or if the achievable cooling capacity of the fuel cell cooling circuit exceeds the predetermined limiting value again.

The cooling capacity of the fuel cell cooling circuit can be understood, in particular, to mean the ability of the fuel cell cooling circuit to cool the fuel cell system. The cooling capacity can be understood to mean the quantity of heat which can be dissipated to the surroundings, for example. The cooling capacity depends, in particular, on the temperature of the fuel cell system and of the coolant, on the flow rate of the coolant, on the ambient temperature and on the available quantity of cooling air. The temperature of the coolant can be adjustable by means of the cooler and/or the chiller and, if appropriate, by means of the heater of the fuel cell cooling circuit. The flow rate of the coolant can be adjustable by adjusting the pumping capacity of the coolant pump of the fuel cell cooling circuit. Coupling of heat from the fuel cell cooling circuit into the battery cooling circuit can therefore be triggered indirectly when a predetermined limiting value for the temperature of the fuel cell system and/or of the coolant in the fuel cell cooling circuit is reached and/or when the capacity of the cooler and/or of the chiller and/or of the coolant pump of the fuel cell cooling circuit is reached.

The cooling capacity of the battery cooling circuit can be understood, in particular, to mean the ability of the battery cooling circuit to cool the battery. The cooling capacity can be understood to mean the quantity of heat which can be dissipated to the surroundings, for example. The cooling capacity depends, in particular, on the temperature of the battery and of the coolant, on the flow rate of the coolant, on the ambient temperature and on the available quantity of cooling air. The temperature of the coolant can be adjustable by means of the cooler and/or the chiller and, if appropriate, by means of the heater of the battery cooling circuit. The flow rate of the coolant can be adjustable by adjusting the pumping capacity of the coolant pump of the battery cooling circuit. Ending of the coupling of heat from the fuel cell cooling circuit into the battery cooling circuit can therefore be triggered indirectly when a predetermined limiting value for the temperature of the battery and/or of the coolant of the battery cooling circuit is reached and/or when the capacity of the cooler and/or of the chiller and/or of the coolant pump of the battery cooling circuit is reached.

In order to counteract or delay a rise in the temperature of the battery, the capacity of the cooler and/or of the chiller of the battery cooling circuit can be increased and/or the capacity of the heater of the accumulator cooling circuit can be reduced.

If the coupling in of heat is triggered when a limiting value for the cooling capacity is reached, the coupling in of heat can be ended, in particular, if the temperature of the battery reaches an upper limit, e.g. the upper limit of the temperature range, in particular the preferred temperature range, envisaged for the operation of the battery.

If the coupling in of heat is triggered by a battery temperature below a temperature range envisaged for the operation of the battery, the coupling in of heat can be ended, in particular, if a temperature within the temperature range, in particular the preferred temperature range, envisaged for the operation of the battery is reached. This can be not only a temperature which represents the lower limit of the temperature range envisaged for the operation of the battery but also a higher temperature, e.g. a temperature in a central range of the temperature range envisaged for the operation of the battery. In the context of one embodiment, the coupling in of heat is ended when a temperature representing the lower limit or the upper limit of the temperature range, in particular the preferred temperature range, envisaged for the operation of the battery is reached.

Before, after or at least partially simultaneously with the coupling of thermal energy from the fuel cell cooling circuit into the battery cooling circuit, the method can comprise the following method step: coupling thermal energy from the fuel cell cooling circuit into the electric motor cooling circuit.

As an alternative or in addition, the method can comprise the following method step before, after or at least partially simultaneously with the coupling of thermal energy from the fuel cell cooling circuit into the battery cooling circuit: coupling thermal energy from the fuel cell cooling circuit into the temperature control circuit.

The present invention furthermore relates to a vehicle, e.g. a passenger vehicle, in particular one with a fuel cell drive system, or a stationary power supply plant which comprises a cooling system according to the invention and/or performs a method according to the invention. In principle, this can be any vehicle, in particular a hybridized vehicle, e.g. a fuel cell and/or electric vehicle which has a fuel cell system and a battery. Inter alia, for example, the vehicle can be a vehicle with a fuel cell system for extending its range, referred to as a fuel cell range extender, and can even encompass a full hybrid fuel cell vehicle, i.e. a vehicle in which full load can be covered by the power of the fuel cell alone.

BRIEF DESCRIPTION OF THE DRAWING

Further advantages and advantageous embodiments of the subject matter according to the invention are illustrated by the drawing and explained in the following description. It should be noted here that the drawing is of a purely descriptive character and is not intended to restrict the invention in any way. In the drawing:

The FIGURE shows a schematic diagram intended to illustrate one embodiment of a cooling system according to the invention.

DETAILED DESCRIPTION

The FIGURE shows that the cooling system 1 comprises a fuel cell cooling circuit 10 for cooling the fuel cell system 11 and a battery cooling circuit 20 for cooling a battery 21, in which thermal energy can be exchanged between the fuel cell cooling circuit 10 and the battery cooling circuit 20 and, in particular, can be coupled from the fuel cell cooling circuit 10 into the battery cooling circuit 20. In particular, the battery 21 can be a traction battery or an electric traction accumulator, e.g. a nickel metal hydride battery or a lithium ion battery. In particular, the fuel cell cooling circuit 10 can be the main cooling circuit of a vehicle.

In order to regulate the flow of heat in terms of time and in terms of quantity, a valve 2, in particular a controllable valve, is provided between the fuel cell cooling circuit 10 and the battery cooling circuit 20. For example, this can be a shutoff valve or a thermostat based on an expanding material. The valve 2 is used, in particular, to ensure that the battery cooling circuit 20 is not heated continuously and in an uncontrolled manner by the fuel cell cooling circuit 10.

A coolant/coolant heat exchanger 3 is furthermore provided for heat exchange between the fuel cell cooling circuit 10 and the battery cooling circuit 20. The heat exchanger 3 is used for thermal coupling of the fuel cell cooling circuit 10 with the battery cooling circuit 20. The illustrated positioning of the coupling heat exchanger within the battery cooling circuit 20, in particular in series and ahead of the battery 11 relative to the direction of flow of the battery cooling circuit 20, is particularly advantageous. There are several possibilities for the specific positioning of the coupling heat exchanger in the fuel cell cooling circuit 10. Since the fuel cell cooling circuit 10 and the battery cooling circuit 20 are usually far apart in terms of their nominal temperature, it makes sense to arrange the coupling heat exchanger in the forward flow path to the fuel cell system 11, i.e. ahead of the fuel cell system 21 relative to the direction of flow of the fuel cell cooling circuit 10.

The FIGURE illustrates that, in addition to the fuel cell system 11, the fuel cell cooling circuit 10 has a cooler 12 cooled by means of ventilated external air, a main coolant pump 13, a coolant control valve 14, a heating device 15, for shortening the warm-up phase after the starting of the vehicle for example, a heat exchanger 16 for controlling the temperature of the cathode gas, e.g. air, an anode gas recirculation fan 17, an anode gas pressure reducer 18 and an ion exchanger 19 for ensuring the maximum permissible electrical conductivity of the coolant. Hydrogen or, if appropriate, also natural gas, biogas, methane, ethane, propane and/or butane can be used as an anode gas, for example.

The FIGURE furthermore illustrates that the battery cooling circuit 20 comprises a battery coolant pump 22, a battery coolant cooler 23a cooling by means of ventilated air, a chiller 23b operated with a refrigerant, an associated coupling heat exchanger 23b' for heat transfer between the coolant in the battery cooling circuit 20 and the refrigerant in the chiller 23b, a control valve 24 and a heater 25. The battery cooling circuit 20 is used for cooling or thermal conditioning of the battery. The refrigerant circuit, the chiller 23b and the coupling heat exchanger 23b' are provided, in particular, for the purpose of cooling the battery, in particular alone, at ambient temperatures of, for example, >35° C. At lower ambient temperatures, the cooling of the battery 21 can be accomplished by means of the battery coolant cooler 23a cooling by means of ventilated air, in particular alone. It may be possible to dispense with the heater 25, which is provided essentially to heat up the battery 21 at a (battery) structure temperature of less than 0° C., especially if the method according to the invention is also used in the case of starting at freezing temperatures. However, it is likewise possible to employ the heater 25 and the method in parallel in order to shorten the warm-up phase. The hydraulic design of the battery cooling circuit 20 is preferably matched to a higher thermal capacity with coupling activated than conventional battery cooling circuits, which are typically designed only for a moderate cooling capacity demand of <1 kW and to absorb brief temperature peaks.

The FIGURE furthermore shows that, in the context of this embodiment, the cooling system furthermore comprises an electric motor cooling circuit 30 for cooling an electric motor 31, wherein thermal energy can also be exchanged between the fuel cell cooling circuit 10 and the electric motor cooling circuit 30. In addition to the electric motor 31, the electric motor cooling circuit 30 comprises an inverter 31', an air compressor 32 and a cooler 33 cooling by means of ventilated air. In the context of this embodiment, no shutoff valve is provided between the electric motor cooling circuit 30 and the fuel cell cooling circuit 10, for which reason the fuel cell cooling circuit 10 and the electric motor cooling circuit 30 can also be regarded as one circuit and, in particular, form the main coolant circuit.

Finally, the FIGURE illustrates that, in the context of this embodiment, the cooling system furthermore comprises a temperature control circuit 40 for controlling the temperature of a passenger cell, wherein thermal energy can also be exchanged between the fuel cell cooling circuit 10 and the temperature control circuit 40. The temperature control circuit 40 comprises not only the heat exchanger 41 but also a shutoff valve 42, via which thermal energy can be coupled from the fuel cell cooling circuit 10 into the temperature control circuit 40 and, if appropriate, out of the latter.

One possible mode of operation of the cooling system shown in the FIGURE is explained below by means of a borderline situation for the cooling capacity at an extremely high ambient temperature:

At an extremely high ambient temperature, the battery 21 can be cooled exclusively by the chiller 23b and hence can be relatively cold, i.e. can have a structure temperature close to 10° C. However, it is likewise possible to employ the operating method when no chiller 23b is provided or when the latter is not in operation since the battery 21 can in any case exploit its temperature window. It is likewise possible to connect up the chiller 23b only after the temperature window of the battery has been exhausted by coupling in thermal energy from the fuel cell cooling circuit 10.

In order to relieve the thermal load on the fuel cell cooling circuit 10 or main coolant circuit 10, the coolant valve 2 can be opened toward the coupling heat exchanger 3. Through the design of the valve 2 and/or of the heat exchanger 3, it is possible to ensure that the heat flow which is then transferred to the battery cooling circuit 20 is limited, e.g. to about 10 kW. In the battery cooling circuit 20, the speed of the battery coolant pump 22 can then be increased in order to satisfy the requirements of the battery 21 in respect of a temperature spread, even given the relatively high heat input.

In the thermal borderline case, operation of the refrigerant circuit of the battery cooling circuit 20 can represent an additional load on the cooling system 1. In order to counteract this, the temperature control circuit 40 for the passenger cell can relieve the load on the cooling system 1 somewhat with appropriate actuation of the shutoff valve 42.

As long as the thermal extreme situation in the fuel cell cooling circuit 10 lasts, the battery 21 can then be "charged" with heat until it reaches its permissible structure temperature. The shutoff valve 2 can then be closed in order to prevent a further increase in the temperature of the battery 21. If the thermal extreme situation persists, the limiting temperature in the fuel cell cooling circuit 10 can then be ensured by derating, i.e. limitation of the motive power. In the battery cooling circuit 20, the battery can be cooled down to a lower structure temperature again after decoupling, if appropriate by continued operation or activation of the battery coolant cooler 23a or of the chiller 23b. Outside thermal extreme situations, e.g. in part-load operating phases, this is particularly simple to achieve.

The invention claimed is:

1. A cooling system for a fuel cell system, comprising
a fuel cell cooling circuit for cooling the fuel cell system and having a first coolant,
a battery cooling circuit for cooling a battery and having a second coolant, the second coolant being separate from the first coolant, and
a valve provided between the fuel cell cooling circuit and the battery cooling circuit,
wherein the first coolant flows through a coolant/coolant heat exchanger, and wherein the second coolant also flows through the coolant/coolant heat exchanger to facilitate heat exchange between the fuel cell cooling circuit and the battery cooling circuit within the coolant/coolant heat exchanger, and
wherein the coolant/coolant heat exchanger is positioned in the battery cooling circuit and in series with the battery, and the valve is positioned outside of the battery cooling circuit such that the valve is operable to shut off the flow of the first coolant from the fuel cell cooling circuit to the coolant/coolant heat exchanger without affecting the flow of the second coolant through the coolant/coolant heat exchanger.

2. The cooling system according to claim 1, wherein thermal energy can be coupled from the fuel cell cooling circuit into the battery cooling circuit.

3. The cooling system according to claim 1, wherein thermal energy can be exchanged temporarily between the fuel cell cooling circuit and the battery cooling circuit.

4. The cooling system according to claim 1, wherein the heat exchange between the fuel cell cooling circuit and the battery cooling circuit takes place ahead of the battery, relative to a direction of flow in the battery cooling circuit.

5. The cooling system according to claim 1, wherein the battery cooling circuit comprises a battery coolant pump and a battery coolant cooler.

6. The cooling system according to claim 5, wherein the battery cooling circuit further comprises a battery coolant heater.

7. The cooling system according to claim 1, wherein the battery is a traction battery.

8. The cooling system according to claim 1, wherein the fuel cell cooling circuit is additionally used to control a temperature of at least one of a cathode gas and an anode gas of the fuel cell system.

9. The cooling system according to claim 1, wherein the fuel cell cooling circuit is a main cooling circuit.

10. The cooling system according to claim 1, wherein the cooling system furthermore comprises an electric motor cooling circuit for cooling an electric motor, wherein thermal energy can be exchanged between the fuel cell cooling circuit and the electric motor cooling circuit.

11. The cooling system according to claim 1, wherein the cooling system furthermore comprises a temperature control circuit for controlling the temperature of a space, wherein thermal energy can be coupled from the fuel cell cooling circuit into the temperature control circuit.

12. The cooling system according to claim 1, wherein the valve is a valve with at least one of an automatically adjustable rate and a self-adjusting flow rate.

13. The cooling system according to claim 1, wherein the valve is at least one of a shut-off valve and a thermostat based on an expanding material.

14. The cooling system according to claim 1, wherein the heat exchange between the fuel cell cooling circuit and the battery cooling circuit takes place ahead of the fuel cell system, relative to a direction of flow in the fuel cell cooling circuit.

15. The cooling system according to claim 1, wherein the battery cooling circuit comprises a chiller operated with a refrigerant and a refrigerant/coolant heat exchanger for heat transfer between a coolant of the battery cooling circuit and the refrigerant of the chiller.

16. The cooling system according to claim 1, wherein the battery is a nickel metal hydride battery or alkali ion battery.

17. The cooling system according to claim 1, wherein the battery is a lithium ion battery.

18. The cooling system according to claim 1, wherein the fuel cell cooling circuit is a main cooling circuit of a vehicle.

19. The cooling system according to claim 1, wherein the flow of the first coolant through the valve is stopped when the valve is shut off.

20. The cooling system according to claim 1, further comprising a temperature control circuit for controlling the temperature of a passenger cell, the temperature control circuit having a shut-off valve configured to deactivate the temperature control circuit.

21. A method for operating the cooling system according to claim 1, comprising coupling thermal energy from the fuel cell cooling circuit into the battery if an achievable cooling capacity of the fuel cell cooling circuit falls below a limiting value, or if a temperature of the battery is below an upper temperature limit provided for operation of the battery.

22. The method according to claim 21, further comprising ceasing the thermal energy coupling from the fuel cell cooling circuit into the battery if at least one of the temperature of the battery and an achievable cooling capacity of the battery cooling circuit reaches a limiting value.

23. The method according to claim 21, further comprising ceasing the thermal energy coupling from the fuel cell cooling circuit into the battery if the achievable cooling capacity of the fuel cell cooling circuit exceeds the limiting value again.

24. The method according to claim 21, wherein the cooling system is operated within a vehicle or stationary power supply plant.

25. A vehicle or stationary power supply plant, comprising the cooling system according to claim 1.

26. The vehicle or stationary power supply plant according to claim 25, wherein thermal energy can be coupled from the fuel cell cooling circuit into the battery.

* * * * *